W. A. BESSERDICH.
STEERING MECHANISM FOR VEHICLES.
APPLICATION FILED JAN. 31, 1917.
1,297,963.
Patented Mar. 18, 1919.
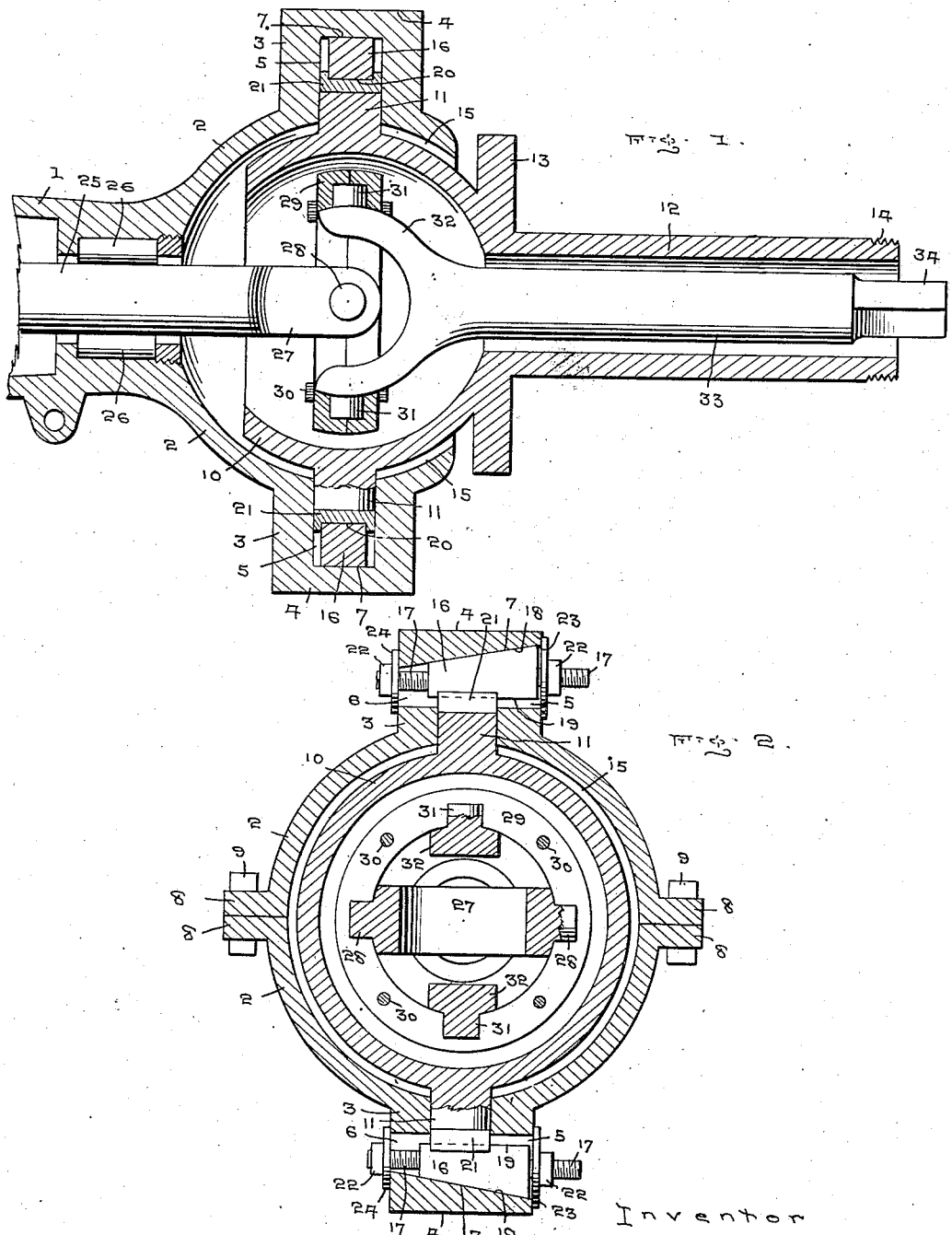
Inventor
W. A. Besserdich
By
W. J. FitzGerald & Co.
Attorneys

UNITED STATES PATENT OFFICE.

WILLIAM AUGUST BESSERDICH, OF CLINTONVILLE, WISCONSIN.

STEERING MECHANISM FOR VEHICLES.

1,297,963.          Specification of Letters Patent.     Patented Mar. 18, 1919.

Application filed January 31, 1917.   Serial No. 145,689.

*To all whom it may concern:*

Be it known that I, WILLIAM AUGUST BESSERDICH, a citizen of the United States, residing at Clintonville, in the county of Waupaca and State of Wisconsin, have invented certain new and useful Improvements in Steering Mechanism for Vehicles; and I do hereby declare the following to be a full, clear, and exact description of the invention, such as will enable others skilled in the art to which it appertains to make and use the same.

My invention relates to a novel form of steering mechanism for vehicles, and is more particularly designed for use upon four wheel drive vehicles such as automobile trucks and the like.

One of the aims of my invention is to provide a front axle for four wheel drive vehicles wherein the front wheels of the vehicle may be efficiently driven by the source of power upon the vehicle, and at the same time the front wheels of the vehicle may be efficiently actuated for guiding the vehicle by any of the usual forms of steering devices used upon vehicles.

Another aim of my invention is the production of a novel form of mechanism for pivotally mounting the stub axles upon the front axle, whereby the vertical axis of the pivotal connections will be efficiently maintained during the steering of the front wheels and the freedom of movement of the front wheels preserved.

A further aim of my invention is to provide means for adjustably mounting the stub axles upon the ends of the front axle whereby to maintain certain contiguous portions of the stub axles and the front axle out of contact with each other to prevent frictional engagement of the respective surfaces of the contiguous portions to eliminate the danger of the binding of these surfaces and the consequent difficulty in effecting the steering of the front wheels.

These and other aims and advantages of my invention will more fully appear as the nature of the invention is more clearly understood from the following specification, the subject matter of the claims, and the views illustrated in the accompanying drawings, in which;

Figure 1 is a vertical longitudinal sectional view of my invention, showing the detailed construction thereof.

Fig. 2 is a vertical transverse sectional view of my invention, showing further detailed construction thereof.

Referring to the drawings, wherein similar reference characters denote corresponding parts throughout the several views, the numeral 1 indicates the front axle housing of hollow or tubular formation, and is provided upon each of its ends, with the substantially spherical outer housings or casings 2, only one end of the axle, however, being herein shown for the purpose of illustrating the novel features of my invention. The housing or casing 2 is provided with the diametrically oppositely disposed hollow bosses 3 provided with the closed end walls or caps 4, and formed through the side walls of the bosses 3 are the oppositely disposed openings 5 and 6, the openings 5 and 6 being preferably rectangular, though the openings 5 and 6 may be round, oval, or other desired conformation, the opening 5, however, being larger in a vertical direction than the opening 6 with the bottom walls of the openings 5 and 6 lying in the same plane, but with the upper wall of the opening 5 lying in a plane above the plane of the upper wall of the opening 6, the respective walls of the openings 5 and 6 of the lower bosses 3 being understood, of course, as disposed reversely from that above described relative to the openings 5 and 6 of the upper boss 3.

Each of the inner walls of the closed ends or caps 4 of the bosses 3 are inclined as are the outer walls of the openings 5 and 6 of the bosses 3, so as to provide the continuous inclined walls or surfaces 7 extending from one side of the bosses 3 to the other. The axle 1 with its outer casing or housing 2 is longitudinally divided to provide an upper section and a lower section, each of the sections being provided at their meeting edges with any suitable number of registering apertured ears 8, secured together through the medium of the bolts 9 for operatively securing together the upper and lower sections of the axle 1 and housing 2.

Positioned within the outer casing 2 of the axle 1 is the substantially spherical inner casing 10, provided with the diametrically oppositely disposed trunnions 11, which trunnions 11 project for a distance into the hollow bosses 3 and are rotatably mounted therein, and upon one side of the inner casing 10 is the tubular extension or stub axle 12, provided at its inner end with the collar or shoulder 13 and at its outer end with the threaded portion 14 for receiving any suitable form of nut, or other suitable securing means, for retaining the hub of a wheel (not shown) upon the tubular extension or stub axle 12, the wheel being revolubly mounted upon the stub axle 12, in any suitable manner.

The inner diameter of the outer casing 2 is sufficiently greater than the outer diameter of the inner casing 10 so as to provide a suitable intervening space 15 between the surface of the inner wall of the outer casing 2 and the surface of the outer wall of the inner casing 10, so as to enable the inner casing 10 to be suitably and properly adjusted within the outer casing 2 for maintaining the facing walls of the outer casing 2 and the inner casing 10 out of contact with each other to a sufficient degree to avoid any danger of the contiguous or facing walls of the casing 2 and 10 becoming bound or stuck together by the expansion or contraction of either the casing 2 or casing 10 therein due to any cause.

To accomplish the efficient adjustment of the inner casing 10 within the outer casings 2, I preferably employ the transversely adjustable sliding bars or wedges 16, which are formed of a length substantially less than the diametrical distance through the bosses 3 and are provided at each of their ends with the threaded stems 17 disposed coaxially with each other and project outwardly through the respective openings 5 and 6 of the bosses 3, when the bars or wedges 16 are disposed within the bosses 3. The bars or wedges 16 are preferably formed rectangular in cross section, though the same may be circular or semi-circular or other desirable conformation in cross section if desired, but the bars or wedges 16, illustrated in the drawings, are provided with the inclined outer walls 18 for engaging the inclined walls 7 within the bosses 3, and a straight inner wall 19 for engaging the seats 20 of the wear plates 21 interposed between the walls 19 of the bars or wedges 16 and the ends of the trunnions 11 of the inner casing 10, whereby the inner casing 10 may be efficiently maintained in adjusted spaced relation within the outer casing 2 by the adjustment of the sliding bars or wedges 16 through the medium of the nuts 22 which are threaded upon the projecting ends of the threaded stems 17 of the bars or wedges 16, the nuts 22 bearing against the washers 23 and 24 surrounding the threaded stems 17 and which washers bear against the outer walls of the bosses 3 and form efficient cover plates for the openings 5 and 6 of the bosses 3 and provide not only an efficient bearing surfaces for the nuts 22 but at the same time provide efficient dust guards for excluding dust, dirt and the like from gaining access within the bosses 3, which, if not efficiently excluded would eventually find its way to the trunnions 11 of the inner casing 10, as well as the remaining operating mechanisms.

Mounted within the axle is the front drive shaft 25 suitably journaled in the roller bearings 26 suitably mounted within the axle housing 1, the front drive shaft being driven through suitable connections with the driving power of the vehicle. The outer end of the shaft 25 within the inner casing 10 is provided with the forked end or yoke 27 provided with the diametrically oppositely and outwardly disposed trunnions 28 which are rotatably seated in one pair of the oppositely disposed recesses formed in the split or sectional ring member 29 having its sections secured together through the medium of the bolts 30.

There are also rotatably seated within the alternate pair of oppositely disposed recesses within the sectional or split ring 29 the outwardly projecting trunnions 31 upon the forked inner end 32 of the stub shaft 33 which extends through the hollow or tubular stub axle housing 12 and is provided at its outer end with the squared projecting end 34 adapted to have suitably secured thereon connecting members or other suitable means (not shown) for operatively connecting the stub shaft 33 with the hub of the wheel (also not shown) for driving the front wheel, which as hereinbefore stated, is revolubly mounted upon stub axle 12.

While I have shown and described a particular form of universal joint and housing, still changes may be made in the construction and configuration thereof without departing from the spirit of the invention as defined by the appended claims.

Having described my invention, what I claim as new and desire to secure by Letters Patent, is:—

1. A spherical housing for a universal joint comprising an outer casing provided with oppositely disposed bosses having transverse openings therethrough, an inner casing having oppositely disposed trunnions disposed within said bosses, slidable members disposed within the openings of each of said bosses for maintaining said casings in spaced relation, and means for adjusting and retaining said members in adjusted position.

2. A spherical housing for a universal joint comprising an outer casing provided with oppositely disposed bosses having transverse openings therethrough, an inner casing having oppositely disposed trunnions disposed within said bosses, slidable members disposed within the openings of each of said bosses for maintaining said casings in spaced relation, threaded stems at the opposite ends of said slidable members, bearing plates at the opposite ends of the transverse openings through said bosses, and means upon said stems for adjusting the same relative to said plates.

3. A spherical housing for a universal joint comprising oppositely disposed bosses having transverse openings therethrough provided with an inclined outer wall, an inner casing provided with oppositely disposed trunnions disposed within said bosses, slidable members having a tapering wall engaging the coöperating tapering wall of the opening through said bosses, and means for adjusting said members lengthwise of said openings.

4. A spherical housing for a universal joint comprising oppositely disposed bosses having transverse openings therethrough provided with an inclined outer wall, an inner casing provided with oppositely disposed trunnions disposed within said bosses, slidable members having a tapering wall engaging the coöperating tapering wall of the opening through said bosses, means for adjusting said members lengthwise of said openings, and wear plates disposed between said slidable member and said trunnions.

5. A spherical housing for a universal joint comprising oppositely disposed bosses having transverse openings therethrough provided with an inclined outer wall, an inner casing provided with oppositely disposed trunnions disposed within said bosses, slidable members having a tapering wall engaging the coöperating tapering wall of the opening through said bosses, means for adjusting said members lengthwise of said openings, threaded stems from the opposite ends of said slidable members, bearing plates at the opposite ends of the openings through said bosses, and adjusting and locking nuts mounted upon said threaded stems to engage said plates.

In testimony whereof I have signed my name to this specification in the presence of two subscribing witnesses.

WILLIAM AUGUST BESSERDICH.

Witnesses:
C. E. GIBSON,
E. E. LARSON.